United States Patent [19]

Ray

[11] 4,444,130
[45] Apr. 24, 1984

[54] SEED PLANTING MACHINE

[75] Inventor: Frank L. Ray, Winfield, Kans.

[73] Assignee: Gretchen L. Wilson, Marengo, Wis.

[21] Appl. No.: 178,135

[22] Filed: Aug. 14, 1980

[51] Int. Cl.³ ............ A01C 5/04; A01C 5/06; A01C 7/18; A01C 7/20
[52] U.S. Cl. .................... 111/1; 111/34; 111/52; 111/59; 111/77; 111/89; 111/90; 111/91
[58] Field of Search ............... 111/89–91, 111/1, 77, 34; 222/352, 220

[56] References Cited

U.S. PATENT DOCUMENTS

| 263,064 | 8/1882 | Shannon | 111/91 |
| 346,234 | 7/1886 | Summers | 111/91 X |
| 530,259 | 12/1894 | Jarnatt | 111/90 |
| 889,285 | 6/1908 | Williams | 111/78 X |
| 1,083,185 | 12/1913 | Bruckman | 111/78 |
| 1,093,462 | 4/1914 | Norris | 111/90 |
| 1,462,847 | 7/1923 | Behrens | 111/91 X |
| 1,689,262 | 10/1928 | van den Ende | 111/91 |
| 1,919,397 | 7/1933 | Salsburg | 111/91 |
| 2,510,658 | 6/1950 | Rassman | 111/81 X |
| 2,690,145 | 9/1954 | Romain | 111/91 |
| 3,349,730 | 10/1967 | Cowell | 111/91 |
| 4,023,511 | 5/1977 | Newman | 111/91 |
| 4,145,980 | 3/1979 | Boots | 111/1 |

FOREIGN PATENT DOCUMENTS

| 1471832 | 1/1967 | France | 111/89 |
| 103708 | 2/1942 | Sweden | 222/352 |
| 334358 | 9/1930 | United Kingdom | 111/89 |
| 561535 | 8/1977 | U.S.S.R. | 111/77 |

*Primary Examiner*—Steven A. Bratlie
*Attorney, Agent, or Firm*—Robert E. Breidenthal

[57] ABSTRACT

A planting machine wherein its planter wheel and a packer wheel trailing the same respectively have peripheral velocities greater and less than the speed of advance of the machine. Shoes on the former open the ground and deposit a seed therein on relative rearward movement, with feet on the packer wheel covering deposited seeds on forward movement thereof relative to the ground. The drives for the planter and packer wheels are interconnected to minimize the overall power requirement. Seeds are dispensed from a hopper to a position adjacent the axle of the planter wheel and spirally nested delivery tubes gravitationally deliver the dispensed seeds to the planter shoes in an arrangement such that a seed is delivered to a shoe only after a predetermined advance of the seed has occurred subsequent to its having been dispensed. The planting and packer wheels are incorporated in planter units with separate, individually adjustable, pneumatic systems being provided to apply supporting forces to the planter and packer wheels.

2 Claims, 17 Drawing Figures

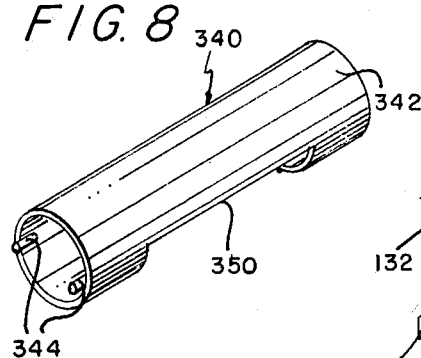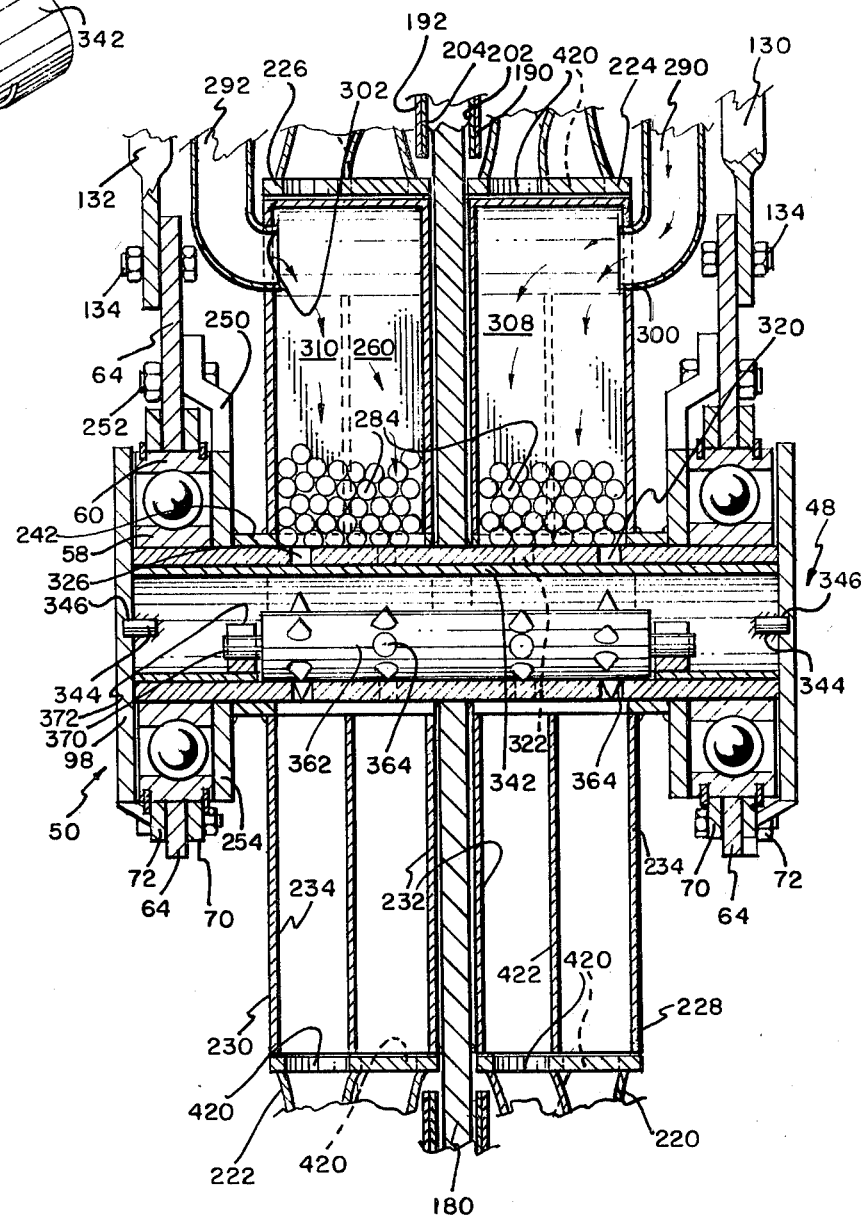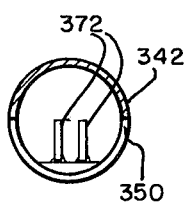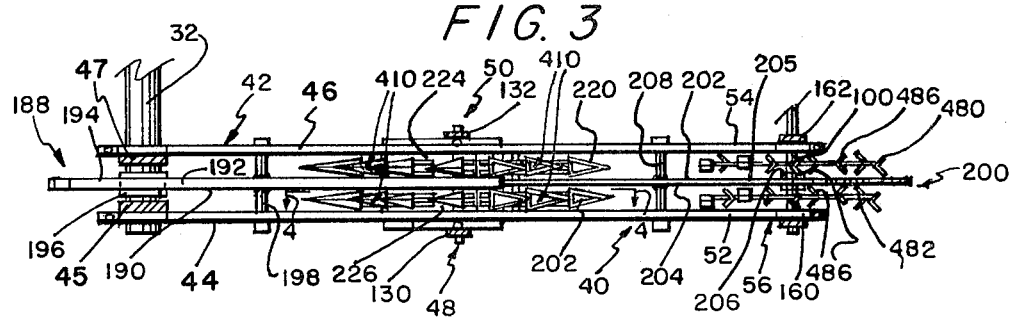

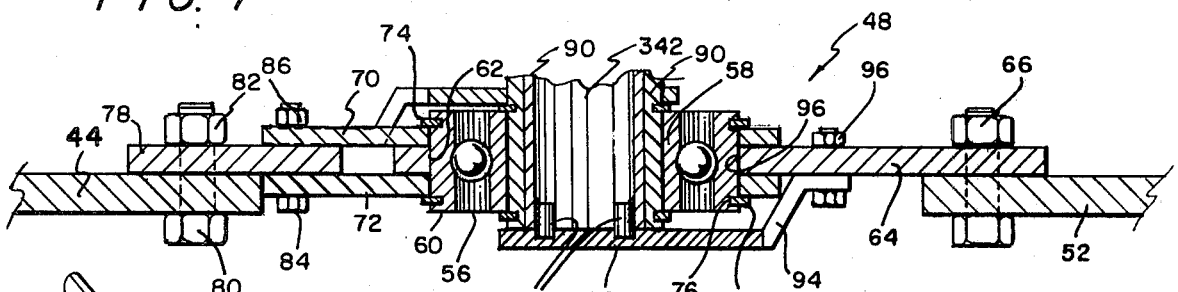
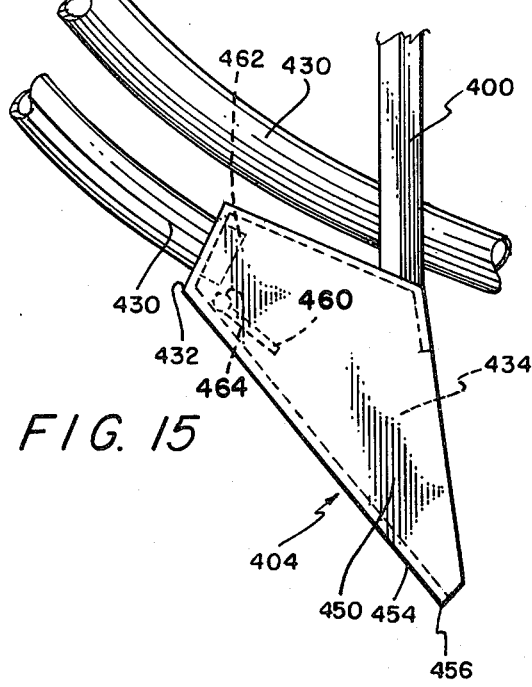
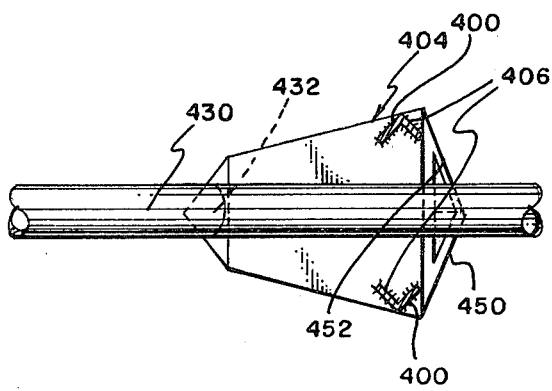
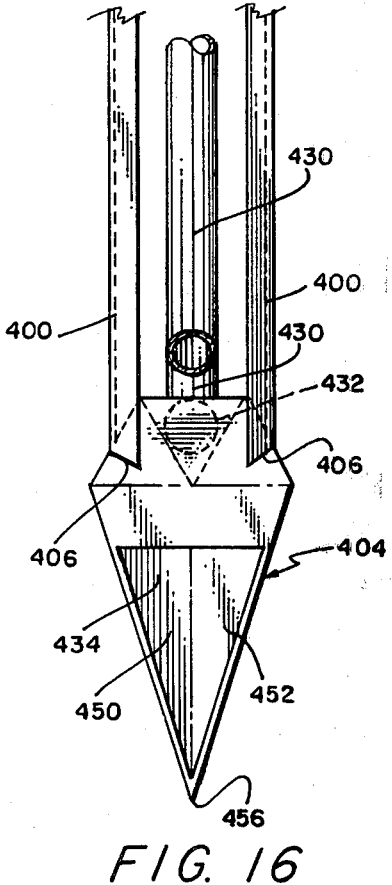

SEED PLANTING MACHINE

The present invention relates to new and useful improvements in planting machines, and more particularly pertains to machines of such type that plant seeds in a predetermined array and which form an individual opening or hole in the ground for each seed to be planted, places a seed in such hole, and thereafter covers the seed in each opening or hole.

Numerous proposals have heretofore been made for the planting of seeds involving planting in an array or for depositing seeds at spaced positions in furrows or openings which are thereafter closed or covered.

Exemplary of such prior art proposals are those set forth in the following U.S. patents:

| | | |
|---|---|---|
| 889,285 | Williams | June 2, 1908 |
| 1,083,185 | Bruckman | Dec. 30, 1913 |
| 1,919,397 | Salsburg | July 25, 1933 |
| 2,510,658 | Rassmann | June 6, 1950 |
| 3,349,730 | Cowell | Oct. 31, 1967 |
| 4,023,511 | Newman | May 17, 1977 |

Each of the known prior art proposals is subject to what is thought to be one or more deficiencies. A frequent deficiency of prior proposals is the fact that the spacing of the planted seeds in the direction of movement of the planter will vary with the seed of advance of the planter. Seed may be planted very close as the machine is slowed or stopped, with seeds being sparcely planted or large gaps appearing on commencing forward movement or during acceleration of the planter. In some proposals the seed dispensing structure is placed so near the periphery of the planter wheel as to substantially increase the size, weight and cost thereof, or the same is such as to crack, break or become clogged by seeds.

The paramount object of the present invention is to provide a machine which will surmount the difficulties mentioned above and which will plant seeds uniformly in a predetermined array or pattern in a manner substantially independent of changes in the speed of advance of the machine with each seed being deposited in an individually prepared opening in the ground that is subsequently individually filled to cover the deposited seed.

An objective incidental to the paramount object is to provide a machine wherein seeds are fed to a delivery means at a rate directly proportional to the speed of advance of the machine, with such delivery means thereafter delivering seed fed thereto to a ground penetrating planting shoe only after a predetermined advance of the machine has thereafter occurred.

Another objective incidental to the paramount objective is to provide a machine wherein a planting shoe forms an opening in the ground while moving relative to the latter opposite the direction of advance of the machine, and the soil displaced to form the opening is thereafter pushed back into the ground opening by a packer foot while the latter is moving relative to the ground in the same direction as that of the advance of the machine.

Still another objective incidental to the paramount objective is to provide an adjustable and yielding supporting force to the planting shoes, as well as to provide a similar though independent, supporting force to the packer feet.

Yet another important objective incidental to the paramount objective is to provide a machine wherein the power drives to the planting and packing wheels are interconnected so that the drag of the packer wheel aids the driving of the planter wheel to reduce the overall power requirements.

A final objective to specifically be enumerated is to provide a planting machine operative on principles applicable to the planting of corn, soy beans, milo and the like, that affords reliability, durability and ease of operation at a reasonable cost.

A broad aspect of the invention involves a planter of the class wherein a rotary planter wheel having a horizontal axis is provided with a plurality of discharge means circumferentially spaced about its periphery for discharging seed, each of said discharge means being provided with means rotatable with the wheel for delivering seed from a position adjacent the axis of the wheel to the discharge means, and feed means for sequentially feeding seed to individuals of the plurality of delivery means as they rotate by said position at a rate that is a function of the rate of rotation of the wheel in one direction, the improvement comprising each of said delivery means being operative to delay delivery of seed fed thereto to the discharge means until at least a predetermined amount of rotation of the wheel in said one direction occurs following such seed having been fed to the delivery means.

Another aspect of the invention involves, in the combination of a rotatable planter wheel of the type including a plurality of planter shoes equally spaced a given angular interval about the periphery thereof with means for dispensing from a source thereof a quantity of seed at a position adjacent the axis of the wheel during each rotational advance of the wheel by an amount equal to the given angular interval, and delivery means for guiding and gravitationally delivering successively dispensed quantities of seed from said position to successive shoes in the sequence of the latter about the wheel; an improved delivery means operable to delay the delivery of a quantity of seed to a shoe until the wheel has a predetermined angular amount in one direction after the dispensing of such quantity of seed.

Still another aspect of the invention involves, in combination with a rotatable planter wheel of the type wherein each planting shoe adjacent its periphery is associated with seed dispensing means that dispenses, at a position adjacent the axis of the wheel, for delivery to the shoe, a quantity of seed from a source thereof upon completion of each revolution of the wheel, the improvement comprising in association with each shoe a seed delivery means operative to receive seed at said position for delivery of such seed to the shoe with the delivery of each dispensed quantity of seed being delayed until after the wheel has rotated a predetermined angular amount following the dispensing of such quantity of seed.

Other objectives, features and advantages of the invention, its practice, use and operation will be most readily appreciated on considering the following detailed description of a preferred embodiment thereof, the same being given in conjunction with the accompanying drawings, wherein:

FIG. 3 is a fragmentary top plan view partly in section, of one of the planting units included in the machine taken upon the plane of the broken section line 3—3 in FIG. 2, such unit including a pair of planter wheels trailed by a pair of drag wheels;

FIG. 6 is a reduced vertical sectional detail view of the seed dispensing means shown in FIG. 5, the same being taken upon the plane of the section line 6—6 and of the axis of the dual planter wheels with the seed knocker means being shown in side elevation;

FIG. 7 is a horizontal sectional detail view of a planter wheel axle bearing and associated structure pivotally connecting the frame links of the planter wheel to the frame links of the packer wheel frame;

FIGS. 8 and 9 are respectively isometric and end views of the shield sleeve and knocker support disposed within and concentric with the axis of the planter wheels;

FIG. 15 is a fragmentary enlarged side elevational detail view of a planter shoe with hidden details being shown in dashed outline; and, FIGS. 16 and 17 are respectively front and top views of the structure shown in FIG. 15.

Figure 1:
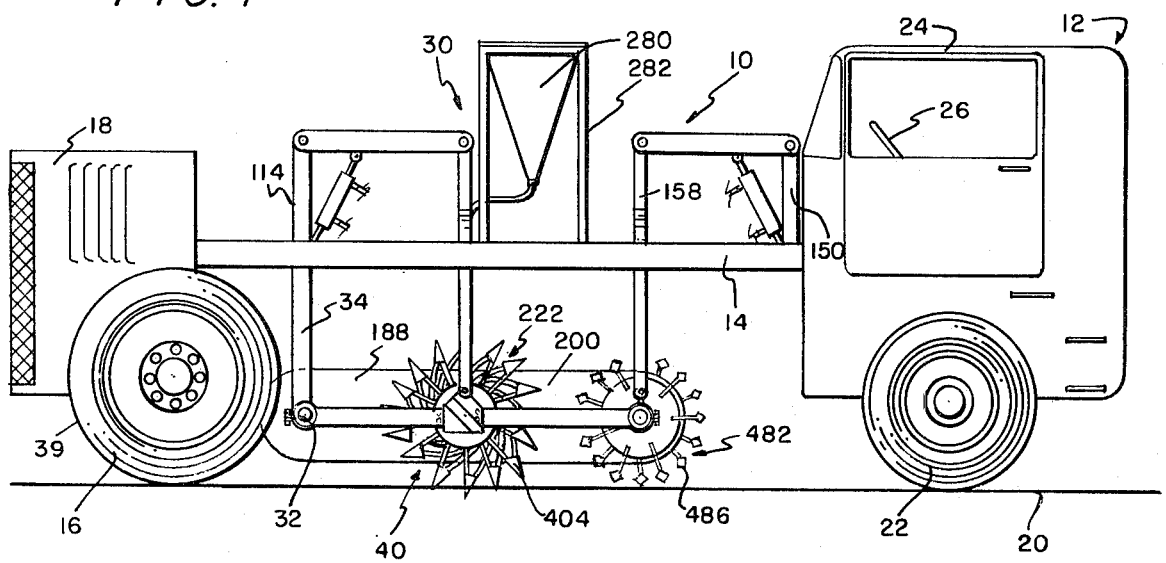
FIG. 1 is a side elevational view of the seed planting machine.

Referring now to the drawings wherein like numerals designate like parts throughout the various views, the numeral 10 designates the seed planting machine of the present invention generally.

The machine 10 includes a self-propelled and dirigible wheeled vehicle designated generally at 12 which is comprised of a generally rectangular open frame 14 supported at the forward end by a pair of traction wheels 16 disposed on opposite sides thereof. A prime mover such as a diesel engine having a cover 18 is mounted on the forward end of the frame and is operatively coupled by conventional means inclusive of an operator controlled transmission, not shown, to drive the traction wheels 16. It is to be noted that the weight of the prime mover and its location to the traction wheels 16 assures that very little slippage, if any, of the traction wheels can occur relative to the ground surface 20 under ground surface conditions suitable for planting.

The rear end of the frame 14 is supported by a pair of dirigible ground wheels 22 disposed on the opposite sides thereof. An operator enclosure 24 is mounted on the rear end of the frame 14, with conventional means, not shown, being provided for enabling an operator in the enclosure 24 to steer the wheels 22 and thus the vehicle 12 through use of the steering wheel partially shown at 26.

The seed planting and seed covering structure is designated generally at 30, the same including a forward transversely extending drive axle 32 rotatably supported at its opposite ends and at positions spaced along its length by support struts 34 that are rigidly fixed to and depend from a forward portion of the vehicle frame 14. Partially shown conventional means inclusive of a gear box 36 and a drive shaft 38 supported from the frame 14 by means not shown (see FIG. 2) is provided for operatively connecting the drive of the traction wheels 16 to the drive axle 32 so that the rate of rotation of the latter is directly proportional to that of the traction wheels 16. The load carried by traction wheels coupled with the antislip character of the tire tread 39 of such wheels 16 assure that the rotational velocity of the axle or shaft 32 will be substantially directly proportional to the speed of advance or ground speed of the vehicle 12 in traveling the ground surface 20.

Figure 2:
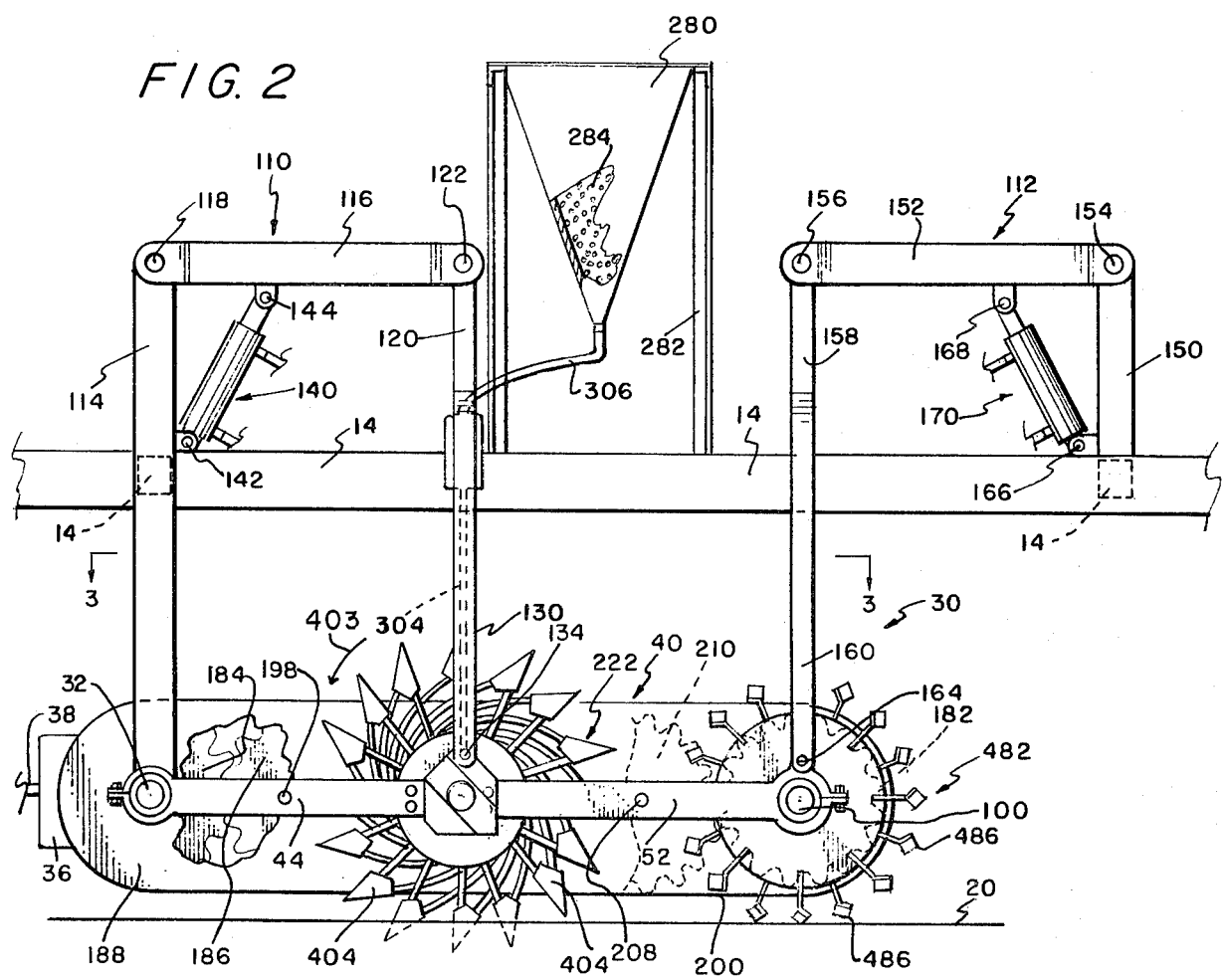
FIG. 2 is an enlarged fragmentary side elevational view of the machine shown in FIG. 1 illustrating in greater detail the seed planting and soil covering structure with parts being broken away and others being shown in dashed outline to disclose hidden details.

A plurality of planter units such as the one shown at 40 in FIG. 3 and visible in FIG. 2 are connected in closely spaced side-by-side relation to each other along the length of the axle or transverse drive shaft 32 for substantially the entire width of the machine 10.

As all the planter units 40 are identical to each other, a detailed description of the unit 40 shown in FIG. 3 and visible in FIGS. 1 and 2 will suffice for all. Such unit 40 comprises a planter frame 42 constituted of a pair of parallel links 44 and 46 journaled at their forward ends on the shaft 32 at 45 and 47 respectively, for free vertical swinging movement of their rear ends.

Means designated at 48 and 50 respectively pivotally connect the trailing ends of the links 44 and 46 to the forward ends of a pair of links 52 and 54 constituting a part of a packing wheel frame designated generally at 56 for vertical swinging movement about a transverse horizontal axis parallel to the shaft 32. The means 48 and 50 jointly constitute structure for rotatably mounting a planter wheel axle coincident with the last mentioned transverse horizontal axis. As the means 48 and 50 are essentially mirror images of each other a detailed description of the means 48 shown in FIG. 7 will suffice for both.

An antifriction bearing 56 inclusive of inner and outer races 58 and 60 is provided, with the latter being rotatably received in an opening 62 in a plate 64 that is fixed to the forward end of the link 52 by a pair of nut and bolt means 66.

The plate 64 is slidingly received between a pair of apertured plates 70 and 72 through which the outer bearing race 60 is journaled. The plates 70 and 72 are removably retained in assembled relation on the bearing 56 by means of split retainer rings 74 positioned in grooves 76 in the outer bearing race 60.

The trailing end of the link 44 is fixed to a spacer plate 78 by a pair of bolts 80 provided with nuts 82, and the spacer plate extends between and is fixed to the plates 70 and 72 by a pair of bolts 84 provided with nuts 86.

As thus far described, the means 48 pivotally connects the link 44 to the link 52 with the outer race 60 of the bearing 56 constituting in effect a pivot pin.

A planter wheel axle in the form of perforated tubular member 90 has its opposite ends received in the inner bearing races 58 of the means 48 and 50. The means 48 also includes a bracket 94 fixedly secured to the plate 64 at 96, such bracket 94 including an ear portion 98 disposed to close and slidably engage the free end of the tubular axle 90. Though not so shown, it will be evident that the ear 98 may be provided with conventional means for preventing the ingress of foreign matter into the bearing 56 so as to prolong the life of the latter. As will be seen presently, the ears 98 of the means 48 and 50 serves another function in addition to preventing endwise movement to the tubular axle 90.

A packer wheel axle 100 has its opposite ends journaled through the trailing ends of the links 52 and 54 of the packer frame 56.

Independent means is provided for each of the planter units 40 that provides a controlled degree of yieldable support from the vehicle frame 14 for the axles 90 and 100 of such unit 40. As the independent means provided for each of the planter units 40 are identical to each other, such means provided for the planter unit 40 exposed to view in FIGS. 1 and 2 will suffice for all. Such independent means includes a means 110 for applying an adjustable vertical force to the axle 90 and a means 112 for effecting a corresponding function for the axle 100.

The means 110 comprises an upstanding standard 114 rigidly fixed to the frame 14 at a longitudinal position corresponding to that of the shaft 32 and at a transverse position corresponding to the transverse center of the planter unit 40, that is, in alignment with the midpoints of the axis 90 and 100 of such unit 40. A rearwardly extending lever 116 has its bifurcated forward end disposed about and pivoted to the upper end of the standard 114 and 118. The rear end of the lever 116 is bifurcated and receives therein and is pivoted to the upper end of a depending yoke 120 at 122. The depending yoke 120 includes transversely spaced depending legs 130 and 132 which have their lower ends respectively connected pivotally to the plates 64 of the means 48 and 50 by nuts and bolts 134.

Double-acting pneumatic cylinder and piston means 140 has its opposite ends pivotally secured to the lower end of the standard 114 and an intermediate position along the length of the lever 116 at 142 and 144.

Conventional means, not shown, are provided whereby, under the control of the operator, the means 140 can be contracted and extended in length to urge the rear end of the lever 116 and through the yoke 130 the planter axle 90 upwardly. As a compressible medium (air) is used in the means 140, the support afforded the planter axle 90 is yieldable in the sense that the latter can move upwardly and downwardly to some extent in a manner dependent upon the application of extraneous forces thereto. It will be understood that while the independent pneumatic means 140 associated with the various planter units 40 will normally be controlled to provide equal vertical support forces for their various planter axles 90, the latter will experience in use over uneven ground surfaces (as will become apparent) differing extraneous vertical forces and the planter axles will move upwardly and downwardly relative to each other.

The means 112 is quite similar in many respects to the means 110 described above and includes an upstanding standard 150 fixed to the vehicle frame 14 at a position rearwardly of the planter unit 40 and transversely at a position in alignment with the standard 114 to directly trail centers of the axles of the planter unit 40. The bifurcated trailing end of a lever 152 is pivoted to the upper end of the standard 150 at 154, and a bifurcated forward end of the lever 152 is pivoted at 156 to the upper end of a yoke 158 that includes transversely spaced depending legs 160 and 162 that are in turn pivotally connected at their lower ends at 164 to the trailing ends of the links 52 and 54 adjacent the packer axle 100.

A double-acting pneumatic cylinder and piston means 170 is pivotally connected to the base of the standard 150 and the lever 152 at 166 and 168 as shown. Conventional control means, not shown, is provided of the same character as those described above in connection with means 140 for pneumatically actuating the means 170. Accordingly, the packer axle 100 is adjustably and yieldingly supported from the frame 14. As in the case of the planter wheel axles 90, the packer wheel axles 100 will move vertically relative to each other in a manner dependent upon the extraneous forces experienced thereby because of compressible character of the medium (air) used.

With other things being equal, the various planter wheel axles 90 are adjusted by the means 140 to have equal heights above ground. The same is true of the various packer wheel axles 100 through the means 170.

The gears 180 and 184, which are identically toothed, are drivingly connected to each other by an identically toothed idler gear 186 disposed therebetween. An elongated housing 188 having spaced side walls 190 and 192 that are joined about their forward and upper edges by a connecting wall 194 is journaled about the axle 32 at 196 so as to partially enclose the gear 184 and substantially protect the latter from the ingress of foreign matter. The planter frame 42 includes a rod 198 having its opposite ends rigidly fixed in any suitable manner to the links 44 and 46. The rod 198 extends through aligned apertures in the housing side walls 190 and 192 and is suitably fixed to such walls. The rod 198 coincides with the axis of the gear 186, and the latter is disposed within the housing 188 and is journaled for rotation on the rod 198 in any suitable conventional manner. The arrangement is such that the housing 188, as well as the meshed gears 184, 186 and 180 swing in unison along with the frame 42 about the axis of the drive shaft or axle 32.

The housing 188 extends rearwardly sufficiently to enclose partially the gear 180.

Analogous structure is provided for drivingly connecting the gears 180 and 182. A housing 200 including side walls 202 and 204 having their upper and rear edges joined by a connecting wall 205 is journaled at 206 on the axle 100 so as to partially enclose the gear 182. A rod 208 constituting a part of the packer frame 56 and having its opposite ends fixed to the links 52 and 54 extends through the housing 200 and is fixed to the latter. The gears 180 and 182 are identically toothed, and are meshed with an identically toothed idler gear 210 disposed in the housing 200 and jounaled on the rod 208. The housing 200 is of lesser width than the housing 188, and has its forward end oscillatably received within the trailing end of the latter in an arrangement such that the trailing and forward ends of the housings 188 and 200, respectively, jointly afford the gear 180 protection against the ingress of foreign matter.

The relationship of the described gears is such that each of the axles 32, 90 and 100 are caused to rotate in the same direction and at identical velocities (neglecting the relative minute effects of pivotal movement of the frames 42 and 56).

The planter unit 40 includes two identical planter wheels 220 and 222 disposed on opposite sides of the gear 180 for rotation in unison with the latter. Before subsequently describing the planter wheels 220 and 222 in detail it will suffice for the moment to appreciate that the wheels 220 and 222 respectively include, as hubs, cylindrical shells 224 and 226 concentric about and substantially spaced from the axle 90 on opposite sides of the gear 180, with the adjacent ends of the shells 224 and 226 being welded or fixedly secured to the opposite sides of the gear 180.

The shells 224 and 226 respectively surround in closely spaced relationship but with free running clearance therebetween a pair of seed holders 228 and 230 disposed about the axle 90 on opposite sides of the gear 180. As the seed holders 228 and 230 are essentially mirror images of each other and are related to other components in clearly analogous ways, a detailed description of the seed holder 230 will suffice for both.

The seed holder 230 comprises a pair of parallelly spaced circular inner and outer end walls 232 and 234 that are integrally joined in their uppermost arcuate extent by a top wall 236. The axle 90 slidingly extends through a collar 242 that is welded to the wall 234, and, as shown, the walls 232 and 234 have central openings that receive the axle 90 therethrough.

Means is provided to prevent rotation of the holder 230 relative to the plate 64; such means being best shown in FIG. 6, wherein the reference numeral 250 designates a bracket fixed to the plate 64 by threaded fasteners 252. The bracket 250 includes an apertured portion that receives the axle 90 for rotation therethrough. Such portion 254 is slidably seated against the bearing races 58 and 60 and is welded to the collar 242, whereby the seed holder 230 is retained against rotation.

Figure 5:
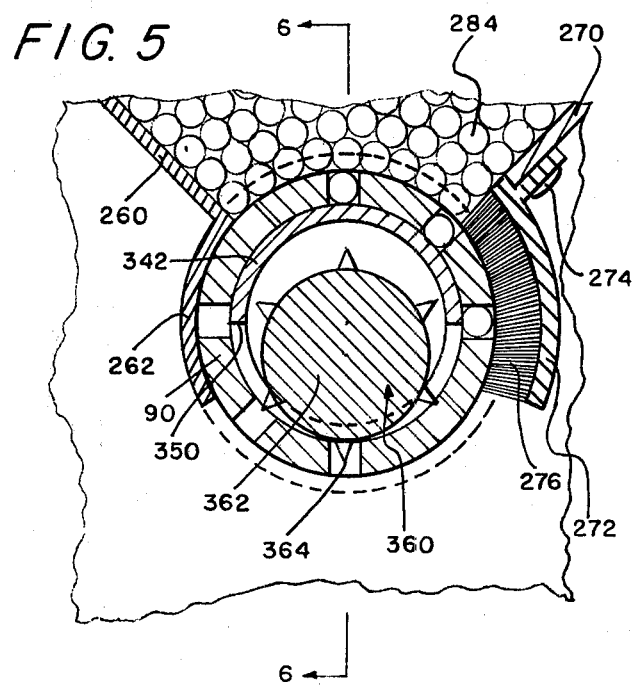
FIG. 5 is a still further enlarged sectional view of the structure shown in FIG. 4, and being taken upon the same section line as FIG. 4.
Figure 10:
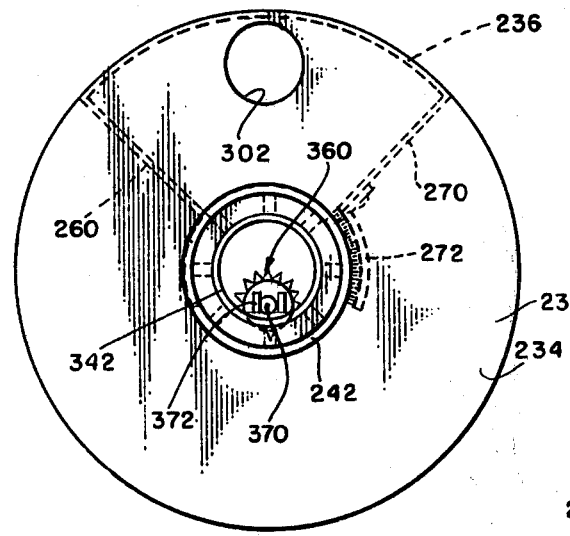
FIG. 10 is an end view of the seed dispensing means for the pair of planter wheels.
Figure 12:
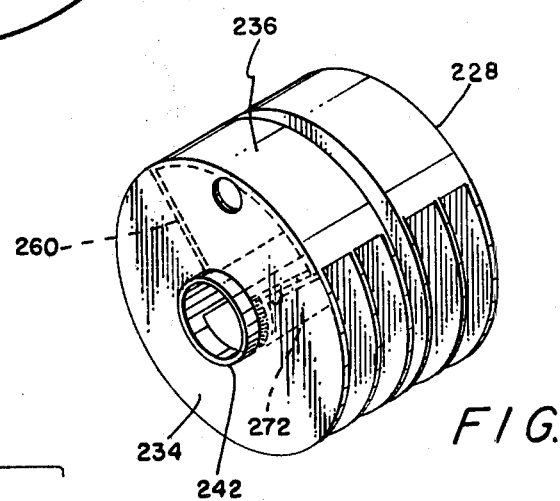
FIG. 12 is an isometric view of the seed holders shown in FIG. 11.
Figure 11:
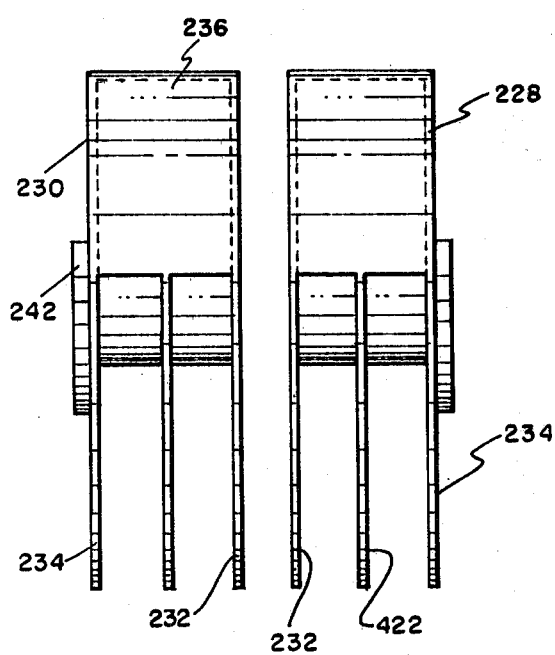
FIG. 11 shows in side elevation the spatial relationship of the pair of seed holders included in the seed dispensing means for the pair of planter wheels.

The seed holder 230 is provided with an internal rear retainer wall 260 that extends radially inwardly (downwardly and forwardly) from the trailing edge of the arcuate top wall 236 to the axle and thence extends downwardly in an arcuate form indicated at 262 to slidingly engage the rear side of the axle 90 as best shown in FIG. 5. The edges of the retaining wall 260 and 262 are joined and are fixedly secured to the walls 232, 234 and 236.

The seed holder 230 additionally includes an internal forward retainer wall 270 that extends radially inwardly (downwardly and rearwardly) from the forward edge of the arcuate top wall 236 to terminate at a position spaced from the axle 90, such wall being securely fixed to the walls 232, 234 and 236 as by welding or the like.

A brush 272 is fastened at 274 to thr radially innermost edge of the wall 270 (see FIG. 5). The brush 272 has the same general shape as the arcuate wall portion 262, and has the flexible and resilient bristles 276 thereof directed toward and bearing against the forward side of the axle 90.

A seed hopper 280 is mounted by means 282 at an elevated position on the vehicle frame 14. Means are provided for gravitationally feeding seed 284 from the hopper 280 to all of the seed holders of all of the planter units 40. A pair of seed feed conduits 290 and 292 are provided for each of the planter units 40, one of which supplies seed to the seed holder 228 and the other of which supplies seed to the seed holder 230. As shown in FIG. 6, the conduits 290 and 292 feed seed, as indicated by the arrows into the seed holders 228 and 230 respectively through openings 300 and 302 in the upper portions of their outer end walls 234 between the retainer walls 260 and 270. The conduits 290 and 292 for the planter unit 40 include extents 304 fastened by suitable means, not shown, to the yoke 120 as well as flexible extents 306 intermediate the hopper 280 and the yoke 126 to accommodate vertical motion of the latter relative to the hopper 280. Thus, seed holding chambers 308 and 310 of seed holders 228 and 230 are kept at least partially filled with seed 284 at all times.

The tubular axle 90 is provided with two sets of axially and peripherally spaced perforations 320 and 322 that register with the seed chamber 308. In a similar manner the tubular axle 90 is provided with sets of perforations 324 and 326 that register with the chamber 310 during rotation of the axle 90.

For reasons yet to be explained, the number of perforations in each of the sets are identical, and the spacing of the perforations in each set is uniform about the axle. The perforations are preferably circular and of a diameter approximating the wall thickness of the tubular axle 90. The diameter of each perforation is somewhat greater than the approximate or average diameter of the individual seeds being handled so that a perforation will readily accommodate a single seed therein. The perforation should not be so great as to fully accommodate two average sized seeds therein. A perforation diameter greater than one average seed diameter but less than about one and a half times an average seed diameter is suitable.

Figure 13:
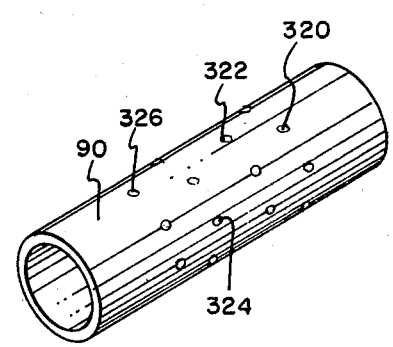
FIG. 13 is an isometric view of the hollow axle constituting the dispensing sleeve of the dispensing means for the pair of planter wheels fixed to such axle.

For another reason to be presently explained, the perforations of the sets 320 and 324 thereof are in longitudinal alignment with each other, and the same is true of the perforations 322 and 326; however, the perforations of the sets 320 and 322 are angularly displaced in a symmetrical manner with respect to each other as clearly shown in FIG. 13.

As thus far described it will be evident that seed 284 in the chambers 308 and 310 will enter perforations in the axle 90 in registry with such chambers. Means is provided for preventing seed entering such perforations from passing directly through the perforations to enter the hollow interior of the axle 90. Such means is designated generally at 340 and is shown in assembled form in FIGS. 4, 5 and 6, and in per se in FIGS. 8 and 9. The means 34 comprises a cylindrical sleeve 342 slidingly received within the tubular axle 90 with free running clearance therebetween. The sleeve 342 is denied rotation by the provision of pairs of lugs 344 provided at its opposite ends that are received within complementary recesses 346 in the ears 98 (see FIG. 6). The lower central portion of the sleeve 342 is provided with an opening 350 for a purpose now to be explained.

With reference to FIG. 5, it will be evident that upon clockwise rotation of the axle 90, seed entering perforations in the axle 90 will rotate with the axle 90 to pass under the brush 272 while being denied entry to the interior of the axle 90 by the sleeve 342. It will be noted that the resilient bristles 276 of the brush 272 tends to free perforations of any excess over one seed with minimum likelihood of causing damage to seed wiped from partial perforation entry.

After a perforation containing a seed has traveled about the sleeve 342 to the opening 350 in the latter, there is no continued likelihood of the seed gravitationally moving to the interior of the axle 90. For reasons presently to be given, it is desired that the seed fall gravitationally from the perforation in which it is disposed in a direction radially outward from the axle 90 on further clockwise movement of the latter. Inspection of FIG. 5 will make it evident that such desired gravitational fall of seed from the axle 90 will occur shortly after the seed has traveled sufficiently to clear the angular extent of the brush 272. Since some seeds may tend to lodge or become stuck in perforations so as not to freely fall gravitationally therefrom, means now to be described is provided for urging seeds from such lodgment so that they may fall gravitationally from the axle 90. Such means is designated generally at 360 which comprises a knocker wheel or a weighty solid cylindrical body 362 disposed within but of considerably less diameter than the internal diameter of the hollow axle 92, with such body being provided with an array of radially extending conical teeth 364 that mesh with the perforations of the sets 320–326 thereof as the axle 90 rotates. The opposite ends of the cylindrical body 362 are provided with axially extending trunnions 370 that are rotatably received between the posts of pairs of upstanding guide posts 372 provided within and adjacent the opposite ends of the sleeve 342 on opposite longitudinal sides of the opening 350. The weight of the knocker wheel is such as to maintain the lowermost teeth 364 thereof in the lowermost perforations in the axle 90. Should a particular seed be temporarily obstinate with respect to its dislodgment, one or both of the trunnions 370 can rise between its respective guideposts 372 to accommodate such seed.

As the planter wheels 220 and 222 are identical, a detailed description of one of such wheels will suffice for both. Accordingly, only planter wheel 220 need be described of which the previously described shell 224 is the hub. The wheel comprises a plurality of angularly spaced, radially extending pairs of spokes 400 having their radially innermost ends fixedly secured, as by welding or the like, to the shell or hub 224 at positions circumferentially spaced about the latter. The spokes 400 of each pair thereof are axially spaced and have their radially outermost extremities fixed at 406 to a planter shoe 404 as best shown in FIG. 16. For the purpose of reinforcing the pairs of spokes 400, a pair of axially spaced, circular bands 410 are disposed on opposite sides of the pairs of spokes 400 and have their adjacent sides suitably fixed as by welding or the like 412 to spokes 400 axially adjacent thereto. The arrangement is such that the shoes 404 of the wheel 220 are securely held in fixed circumferentially spaced positions about the shell 224 constituting the hub of such wheel 220.

The hub 224 is provided with a series of circumferentially spaced openings 420 therethrough corresponding in number to the number of planting shoes 404. Alternate openings 420 are axially relatively near the gear 180 and the others are relatively remote from the gear. The seed holder 228 is provided with a central partition or divider wall 422, and the arrangement is such that alternate openings 420 in the hub 224 communicate with the interior of the seed holder 228 between the partition wall 422 and the wall 232, while the other openings communicate with the interior of the seed holder 228 between the partition wall 422 and the wall 234. Such axial staggering of alternate openings 420 allows the latter to be of reasonable size without unduly weakening the hub 224.

As thus far described, with the seed holder 228 being disposed within the hub 224 with free running clearance therebetween, seeds are alternately dispensed to the seed holder 228 through the perforations 320 and 322 on opposite sides of the partition or divider wall so as to gravitationally fall alternately through openings 420 on opposite sides of the divider or partition wall 422.

Means are provided for delivering seeds falling through the openings 420 to the planting shoes 404. Such means comprises a plurality of circumferentially spaced, spiral shaped tubes 430 disposed between the reinforcement bands 410 and having their radially innermost inlet ends suitably secured to the hub 224 so that circumferentially adjacent tubes open to circumferentially adjacent openings 420. Thus, one set of alternate tubes 430 communicates with the portion of the interior of the seed holder 228 between the dividing wall 422 and the wall 232, while the other set of tubes communicate between the walls 422 and 234.

The radially outermost outlet ends of the delivery tubes 430 are connected at 432 to the shoes 404 to communicate with the hollow interiors 434 of the latter.

Figure 4:
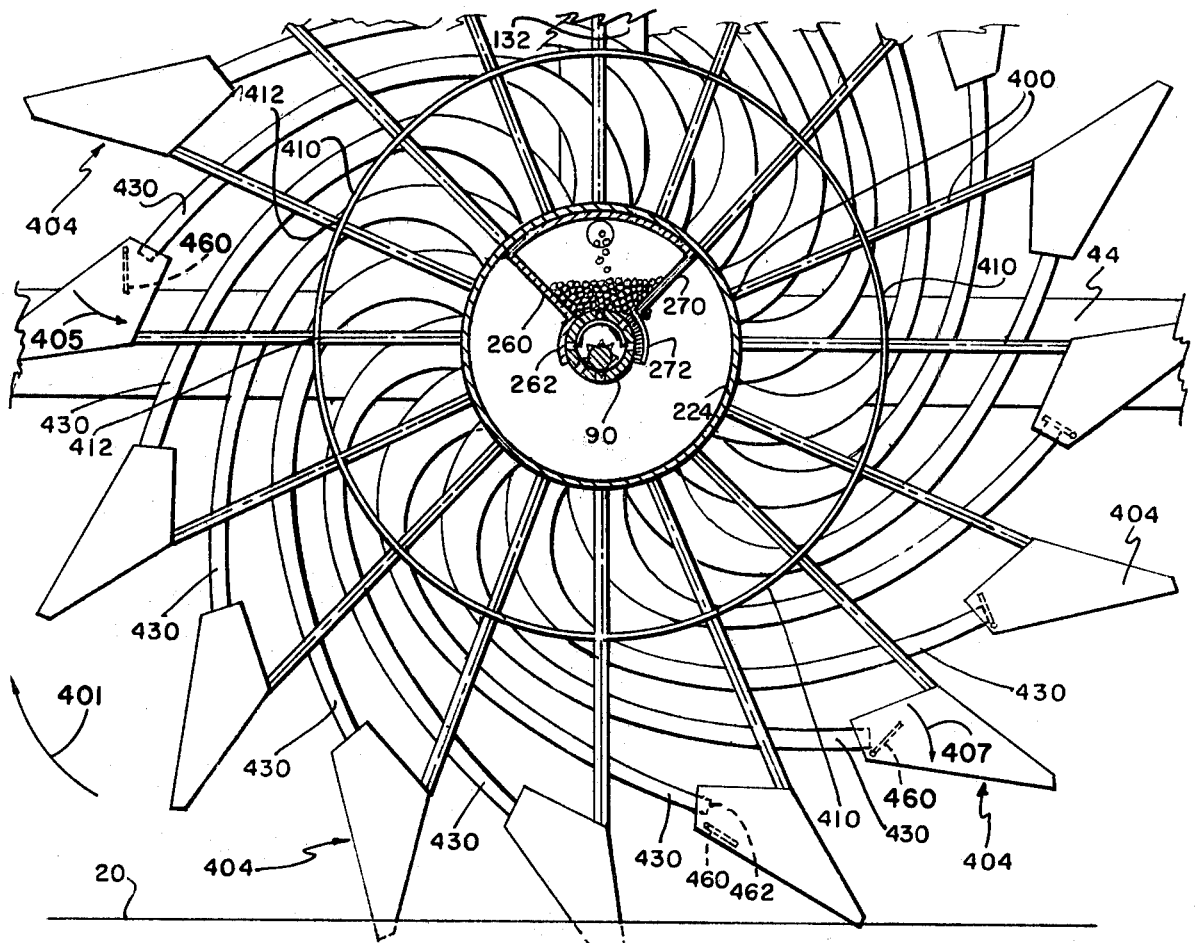
FIG. 4 is a fragmentary and enlarged vertical sectional view taken upon the plane of the section line 4—4 in FIG. 3.

Noting that the planter wheel 220 shown in FIG. 4 rotates in a clockwise direction indicated by the arrow 401 during planting on forward movement of the vehicle 12, it should also be noted that each planting shoe 404 is angularly displaced counterclockwise from the inlet end of the delivery tube 430 to which such shoe is connected as a consequence of the spiral configuration of the tubes 430. It should also be noted that the curvature of each delivery tube 430 is such that the latter is directed essentially toward the center of the axle 90 at its inlet end, while approaching tangency to its circular travel path at its connection 432 to the shoe 404. Such direction of rotation of the planter wheel is indicated at 403 in FIG. 2.

The important result of the features pointed out in the preceding paragraph is that a seed dropping through an opening 420 in the hub 224 to enter a tube 430 as its inlet end passes below the bottom of the seed holder 228 cannot pass gravitationally immediately to its associated shoe 404, and such gravitational delivery cannot occur until the planter wheel 220 has rotated clockwise at least a predetermined amount. Such predetermined amount being at least such as to bring about a downward inclination of the outlet end portion of the tube 430. If the outlet end portion of the tube 430 were tangential to its circular travel path, such amount of rotation would be 90°. As shown, such angle is somewhat less than 90°, and is such that the associated shoe or planting hoe 404 is nearing its position of entry into the ground. It is preferred that the outlet end of the tube 430 be somewhat inclined to tangency with its travel path so that a seed can be delivered gravitationally therefrom at a shoe 404 position occurring angularly just prior to the shoe or hoe moving directly below the wheel axle 90, it being noted that the angular position of delivery is shown in FIG. 4 as being somewhat greater in advance of the axle 90 than is preferred. Modest angular departures, plus or minus, from tangency are deemed within the scope of engineering choice. In other words, the tubes 430 can conveniently be curved through a selected arc greater than or less than 90° so that a seed will be delivered gravitationally thereby to a shoe 404 at any angular position selected from when the shoe 404 first advances to within about 30° of being directly below the axle 90 to when the shoe 404 passes to about 15° behind being directly below the axle 90. As indicated, previously, it is preferred that the tubes 430 be such as to deliver to a shoe 404 when the latter is approaching a position directly below the axle 90.

The total number of perforations 320 and 322 is equal to the number of tubes 430 and the wheel 220, and such number is of course the same as the number of shoes or hoes 404 included in the planter wheel 220. As the openings 420 are axially staggered, the total number of tubes 430 (and shoes 404) is an even number or multiple of two.

As thus far described, a seed is dispensed or knocked from one of the openings 320 and 322 on each angular advance of the wheel 220 equal to the angular spacing of the shoes 404, with such seeds being sequentially received in the inlet ends of the tubes 430 as they pass below the axle 90. A seed received in the inlet end of a tube 430 will be delivered to its respective shoe or hoe 404 only after such shoe or hoe 404 is substantially directly below the axle 90, substantially in a manner totally independent of the rate of rotation of the planter wheel 220.

In other words, seeds will be delivered to a planting shoe or hoe 404 essentially only when the latter is in planting position. Such is quite important when changes in the speed of advance of the vehicle 12 are caused to occur. For example, if the vehicle is slowed to a stop, seeds which may have been dispensed will be sequestered in the tubes 430 until the vehicle 12 has thereafter been moved forward enough to move the shoes 404 of such tubes 430 into planting positions. Thus, customary excessively dense seeding on machine deceleration and customary excessively sparse seeding on machine acceleration are avoided.

For reasons yet to be explained the peripheral speed of rotation of the planter wheel 220 is greater than the speed of advance of the vehicle 12 so that the shoes or hoes 404 move rearwardly relative to the ground. Accordingly, as the height of the axle 90 is such that the lowermost shoes 404 penetrate into the ground, such lowermost shoes or hoes 404 move rearwardly relative to the ground penetrated thereby. As the rear portion of the shoes 404 as viewed in the lowermost portion of their travel are V-shaped with rearwardly and downwardly convergent side walls 450 and 452 that define an acute dihedral angle as clearly shown in FIGS. 15, 16 and 17. The arrangement is such that the shoe or hoe 404 has a sharp rear edge 454 that extends upwardly and rearwardly from a sharp lower end point 456 of the shoe 404 when the spokes 400 are vertical as shown in FIG. 15. Accordingly, each shoe or hoe 404, in the course of its initial penetration to final emergence from the ground acts as a sharp hoe device that opens a hole in the ground while spreading the displaced soil laterally for the most part.

It is during such ground penetration and hole formation that a seed is delivered by the tube 430 to the shoe 404 whereupon such seed passes through the hollow interior 434 along the juncture of the walls 450 and 452 to be deposited in the bottom of the hole adjacent the point 456.

Means is provided for preventing gravitational entry of soil into the tubes 430 when the discharge or radially outermost ends thereof are directed upwardly. Such means shown in FIGS. 4 and 15 comprises a flapper or gate valve plate 460 disposed within each of the shoes 404 adjacent the discharge end 462 of the delivery tube 430. The plate 460 is pivotally connected to the shoe 404 about an axis parallel to the axle 90 by a pivot pin 464 disposed adjacent the tube end 462. The position of the pin 464 relative to the tube end 462 is such that the weight of the valve plate 460 will gravitationally cause the same to swing into a tube closing position from its open position shown in FIG. 15 upon clockwise movement of the shoe 404 sufficient for the discharge end 462 of the tube 430 to be horizontal and horizontally directed. The valve plate 460 thereafter remains in tube closing position during further clockwise movement (thereby precluding any soil that may have been caught within the shoe 404 from falling into the tube 430) until the outlet end 462 is horizontally directed in the forwardly direction. Such operation of the valve plate 460 will be best understood wherein it will be seen that the same turns counterclockwise (opposite the planter wheel rotation direction 401) when at the left side of the wheel 220 as viewed in FIG. 4 as indicated by the arrow 405. Continued wheel rotation eventually causes closure of the associated tube 430, and such closure is continued until the same is to the lower right of the wheel 220 at which time the same rotates clockwise to open the tube 430 as indicated by the arrow 407.

Each planter unit 40 includes means that are provided to refill the ground openings made by the shoes or hoes 404 of the planter wheels 220 and 222 and to cover the seeds deposited therein. Such means comprises a pair of packer wheels 480 and 482 that are fixed to the packer axle 100 for rotation therewith. The packer wheels 480 and 482 are respectively coplanar with and directly trail the planter wheels 220 and 222. The packer wheels 480 and 482 are identical to each other and are of lesser overall diameter than the planter wheels 220 and 222, so that the peripheral velocities of the packer wheels 480 and 482 are less than the peripheral velocities than the planting wheels 220 and 222, it being recalled that the axles 90 and 100 are geared together to rotate at identical velocities.

While the axles 90 and 100 rotate at velocities so related to the speed of advance of the vehicle 12 that the peripheral velocities of the bottoms of the planter wheels 220 and 222 are rearwardly relative to the ground surface 20, the converse is true with respect to the peripheral velocities of the bottoms of the packer wheels 480 and 482 as they move forwardly relative to the ground surface 20 during forward movement of the vehicle 12. Each packer wheel has a plurality of V-shaped packer feet 486 spaced circumferentially thereabout. The number of packer feet 486 on each packer wheel is equal to the number of shoes 404 provided on each planter wheel; sixteen in the illustrated form of the invention.

The V-shaped feet 486 have a configuration and orientation that can be best appreciated on explaining that the same have a footprint in the shape of a V that opens in the forward direction. Considering the representative coaction of the wheels 220 and 480 and the spacing of the axles 90 and 100, the arrangement is such that during forward movement of the vehicle 12, a foot 486 makes initial contact with the ground 20 immediately rearwardly of a hole opened by a shoe 404 so that on passage of the axle 100 over such hole, the forward movement of the V-shaped foot 486 relative to the ground will result in the soil that was previously laterally displaced in the making of the hole being embraced and cammed, so to speak, back in the hole to fill the latter and cover the seed disposed therein.

From the foregoing, the planter unit 40 operates in virtue of the planter wheels 220 and 222 to form two parallel rows of openings or holes and to deposit a seed in each of the openings, with the packer wheels 480 and 482 thereafter serving to fill such openings and cover the seeds therein.

Obviously, considerable power is required to drive the planting wheels 220 and 222 as they do not merely roll along the ground but rotate in such a way as to tend to urge the vehicle 12 forwardly. However, all such power is not directly provided by the prime mover 18 through the shaft or axle 32 for the reason that rotation is imparted to the packer wheels 480 and 482 from the ground as the vehicle 12 passes thereover, and such power (indirectly obtained from the prime mover 18) contributes to the drive of the axle 90. The combination assures proper synchronization of the operation of the planting and packer wheels, avoidance of providing any sort of energy wasting brake on the packer wheels, and lessens the loads on the drive shaft 38 and the gearing 36.

As explained earlier, the rate at which seeds are dropped to the ground bears a virtually linear relationship to the rate of vehicle movement, whereby the rate of seeding is not excessively high on deceleration or excessively low on acceleration. Such beneficial result occurs because individually quantified seed portions (individual seeds) are synchroniously fed to delivery tubes arriving in position to receive the same coupled with the fact that the tubes delay delivery to the shoes until the latter actually arrive in planting position. Such is not only an important advantage on starting or stopping forward progress of the vehicle 12, but is also important as the vehicle 12 is turning or negotiating curves as the planting units 40 will be changing velocities relative to each other on entering or straightening from turns.

As previously described, yieldable adjustable pneumatic independent support is provided for each of the planting units 40. Such allows the units 40 to move independently of each other to accommodate irregularities in the ground surface, as well as allowing independent movement of the axles 90 and 100 of each unit for similar reasons. Relative changes in the support provided the axles 90 and 100 allows variations in the relative forces with which the planting and packer wheels contact the ground to suit the operator's preference as to ground penetration by the planter wheels and the packer wheels, etc.

Figure 14:
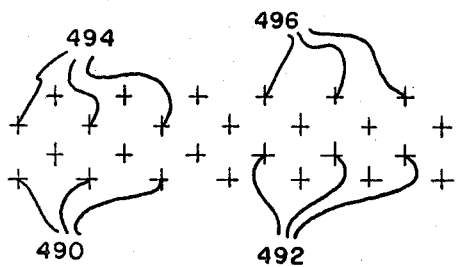
FIG. 14 is a schematic representation of an array of seed planting sites such as may be effected by the seed planting machine.

In the preferred construction, the planter wheels 220 and 222 are angularly offset from each other by an amount equal to one half the angular spacing of the shoes 404 on the planter wheels, so that seeds are alternatively planted by the wheels 220 and 222 in their respective rows. Needless to say, the feet of the packer wheels are similarly offset from each other. With such preferred construction, a planting pattern such as shown in FIG. 14 is obtained wherein the numerals 490 and 492 respectively designate the positions at which the wheels 220 and 222 of a planter unit 40 plant seeds. The wheels of an adjacent planter unit 40 effect the planting positions indicated at 494 and 496. The overall planting pattern serves to optimize the minimum spacing between seeds for a given overall seeding density which in turn tends to maximize crop yields.

Except where it is obvious that other materials are customary employed such as rubber for tires, etc., the apparatus of the present invention is made of steel components that are joined by bolted or otherwise joined together by welding or riveting by techniques well known in the art.

Planting units 40 can be appropriately sized to be applied to the planting of most kinds of crops ordinarily planted in rows such as corn, soy beans, milo, and the like.

With the invention, its manufacture and use having been described sufficient to enable ready and full enjoyment thereof, attention is now directed to the appended claims for an appreciation of the scope of the invention.

I claim:

1. In a planter of the class wherein a rotary planter wheel having a horizontal axis is provided with a plurality of discharge means circumferentially spaced about its periphery for discharging seeds, each of said discharge means being provided with means rotatable with the wheel for delivering seed from a position adjacent the axis of the wheel to the discharge means, and feed means for sequentially feeding individual quantitized portions of seed to individuals of the plurality of delivery means as they sequentially rotate by said position at a rate that is a function of the rate of rotation of the wheel in one direction, the improvement comprising each of said delivery means being operative to delay delivery of a quantized portion of seed fed thereto to the discharge means until at least a predetermined amount of rotation of the wheel in said one direction occurs following such seed portion having been fed to the delivery means, each of said discharge means comprising a planter shoe adapted for ground penetration, and means for rotating the wheel while translating the wheel horizontally in a direction normal to the axis thereof, and wherein the velocities of rotation and translation are maintained directly proportional to each other and are so related that the shoes in the lowermost portion of their movement have a resultant horizontal velocity component relative to the axis of the wheel that is greater than and opposite in direction to that of wheel translation, whereby the planter shoe moves rearwardly relative to the ground penetrated thereby, a packer wheel having a horizontal axis parallel to that of the planter wheel, means for horizontally translating the packer wheel in the same direction and at the same velocity as that of the planter wheel with the packer wheel trailing the planter wheel with respect to the direction of translation, said packer wheel having a plurality of circumferentially spaced feet, with each of said feet being adapted to push soil into small earthen depressions over which the same may be moved during translation and rotation of the packer wheel, means for rotating the packer wheel in the same direction and at a rate proportional to the rate of rotation of the planter wheel, with said packer wheel rotating at a rate such that the feet during the lowermost portion of their travel have resultant horizontal velocity component less than and in the same direction as that of the translation of the wheels, and with the shoes, feet, and velocities of translation and rotation being so selected and arranged that sequentially lowermost feet successively occupy the same spaces as previously occupied sequentially by lowermost shoes, a power drive means common to both of said means for rotating the wheels, whereby the drive requirement for the planter wheel is partially met by the packer wheel, wherein said planter and packer wheels are respectively provided with a planter axle and a packer axle in axial alignment and rotatable therewith, a drive shaft parallel to and disposed forwardly of said planter and packer axles, a planter frame mounted on the drive shaft for vertical swinging movement about the axis thereof, said planter axle being journaled in said planter frame, a packer frame mounted on the planter axle for vertical swinging movement about the axis thereof, said packer axle being journaled in the packer frame, a vehicle inclusive of a frame and a traction wheel, said drive shaft being carried by the vehicle frame, a prime mover drivingly connected to the drive shaft and the traction wheel, said drive shaft being drivingly connected to the planter axle with the latter being drivingly connected to the packer axle, a first fluid powered means for adjustably applying a supporting force to the planter axle from the vehicle frame, and a second fluid powered means for adjustably applying a supporting force to the packer axle from the vehicle frame.

2. In the combination of a rotatable planter wheel of the type including a plurality of planter shoes equally spaced a given angular interval about the periphery thereof with means for dispensing from a source thereof a predetermined quantity of seed at a position adjacent the axis of the wheel during each rotational advance of the wheel by an amount equal to the given angular interval, and delivery means for guiding and gravitationally delivering successively dispensed quantities of seed from said position to successive shoes in the sequence of the latter about the wheel; an improved delivery means operable to delay the delivery of a quantity of seed to a shoe until the wheel has rotated a predetermined angular amount in one direction after the dispensing of such predetermined quantity of seed, said seed dispensing means comprising a perforated tubular member rotatable with and concentric with the axis of the planter wheel, non-rotatably mounted seed box having an open lower end closed by an upper portion of the tubular member, a guard sleeve non-rotatably mounted within the tubular member for preventing passage of seed gravitationally from the seed box to the interior of the tubular means through the perforations of the latter, with perforations having a circumferential angular spacing corresponding to said angular interval, said delivery means being rotatable with the planter wheel and encircling the seed box, said guard sleeve having a lower slotted side, a rotatable seed knocker means within the tubular member and having protrusions meshing with the perforations of the tubular member for dislodging seeds from the perforations, and said seed box including and being in part defined by a yieldable means at its lower open end that engages the tubular member.

* * * * *